(12) United States Patent
Vrba et al.

(10) Patent No.: US 11,628,837 B2
(45) Date of Patent: Apr. 18, 2023

(54) VEHICLE SPEED MANAGEMENT SYSTEMS AND METHODS

(71) Applicant: Westinghouse Air Brake Technologies Corporation, Wilmerding, PA (US)

(72) Inventors: Matthew Vrba, Marion, IA (US); Jeffrey Kernwein, Cedar Rapids, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 252 days.

(21) Appl. No.: 16/728,753

(22) Filed: Dec. 27, 2019

(65) Prior Publication Data
US 2021/0197818 A1 Jul. 1, 2021

(51) Int. Cl.
*B60W 30/00* (2006.01)
*B60W 30/18* (2012.01)
*B60W 50/00* (2006.01)
*G06T 7/536* (2017.01)
(Continued)

(52) U.S. Cl.
CPC ............ *B60W 30/18* (2013.01); *B60W 50/00* (2013.01); *G06T 7/536* (2017.01); *G06T 7/73* (2017.01); *B60W 2050/0088* (2013.01); *B60W 2420/42* (2013.01); *B60W 2554/20* (2020.02); *B60W 2554/4041* (2020.02); *B60W 2555/60* (2020.02); *B60W 2720/106* (2013.01);
(Continued)

(58) Field of Classification Search
CPC .. B60W 30/18; B60W 50/00; B60W 2420/42; B60W 2720/106; B60W 2554/4041; B60W 2554/20; B60W 2050/0088; B60W 2555/60; G06T 7/536; G06T 7/73; G06T 2207/30204; G06T 2207/30252; H04L 67/12
See application file for complete search history.

(56) References Cited

U.S. PATENT DOCUMENTS

| 10,318,821 B2 * | 6/2019 | Kim ................ B60W 30/18154 |
| 2016/0191886 A1 * | 6/2016 | Tanabe ..................... G07C 5/06 386/240 |
| 2019/0291726 A1 * | 9/2019 | Shalev-Shwartz .... B60W 40/06 |

(Continued)

OTHER PUBLICATIONS

PickPik "Royalty-Free photo: gleise, railway, seemed, railroad tracks, rail traffic, upper lines, loneliness, fog, catenary, morning hour, photo" https://www.pickpik.com/gleise-railway-seemed-railroad-tracks-rail-traffic-upper-lines-33896 (28 pages).

(Continued)

Primary Examiner — Ian Jen
(74) Attorney, Agent, or Firm — The Small Patent Law Group LLC; Will Breeze

(57) ABSTRACT

Methods and systems for managing a speed of a vehicle are provided. The methods and systems obtain image data from one or more vision sensors disposed onboard a vehicle. A stopping distance of the vehicle is determined based at least in part on the image data. A moving speed of the vehicle and a speed limit of the vehicle are determined. The speed limit is determined based on the stopping distance that is determined from the image data. The methods and systems control movement of the vehicle based on a difference between the moving speed of the vehicle and the speed limit of the vehicle.

20 Claims, 5 Drawing Sheets

(51) Int. Cl.
  *G06T 7/73*      (2017.01)
  *H04L 67/12*     (2022.01)
(52) U.S. Cl.
  CPC ............... *G06T 2207/30204* (2013.01); *G06T 2207/30252* (2013.01); *H04L 67/12* (2013.01)

(56) References Cited

U.S. PATENT DOCUMENTS

2019/0291728 A1* 9/2019 Shalev-Shwartz .... G01S 17/931
2019/0299984 A1* 10/2019 Shalev-Shwartz .... G01S 17/931
2019/0337509 A1* 11/2019 Shalev-Shwartz .......................... B60W 50/0097
2019/0384294 A1* 12/2019 Shashua ............... G05D 1/0253
2019/0384295 A1* 12/2019 Shashua ................ G06V 20/56
2019/0384296 A1* 12/2019 Shashua ............... G05D 1/0278

OTHER PUBLICATIONS

Office Action dated Jan. 20, 2023 for corresponding Canadian Patent Application No. 3,102,494 (3 pages).

* cited by examiner

VEHICLE SPEED MANAGEMENT SYSTEMS AND METHODS

BACKGROUND

Technical Field

The subject matter described herein relates to methods and systems for managing speed of a vehicle.

Discussion of Art

Vehicles in a vehicle network can operate according to automated safety systems that stop or slow down operations of the vehicles in certain locations. These systems may rely on databases that associate different locations of routes being traveled upon by the vehicles with different speed limits. Additionally or alternatively, the systems can communicate a maximum restricted speed in response to any static or dynamic condition associated with portions of the pathways presenting an increased risk to the safety of the vehicles in the vehicle network. Many types of events can increase the risk to vehicles, but do not require stopping the vehicles from moving within the vehicle network. For example, events occurring within the vehicle network (e.g., signaled pathways, occupied portions of the pathways, vehicles not controlled by the vehicle network on portions of the pathways, etc.) can cause the automated safety systems to communicate a maximum restricted speed to the vehicles in portions of the vehicle network. If the vehicles travel in excess of these limits, then the systems may communicate signals to the vehicles that slow or stop the vehicles. Conventional systems employ predefined and static speed limits for different locations of routes. The predefined and static speed limits may not account for factors such as geography, weather conditions, and vehicle state information (e.g., length, mass, height, consist.). However, many vehicle networks provide for or allow a dynamic restricted speed based on geography, weather conditions, and vehicle state information. In one example, the Federal Railroad Administration defines restricted speed to mean a speed that will permit a train or other equipment to stop within one-half the range of vision of the person operating the train or other equipment, but not exceeding 20 miles per hour, unless further restricted by the operating rules of the railroad. As a result, the systems may permit vehicles to travel in excess of or below the restricted speeds when geography, weather conditions, and vehicle state information are accounted for. This can pose a significant safety risk.

BRIEF DESCRIPTION

In accordance with one or more embodiments described herein, a method is provided that includes obtaining image data from one or more vision sensors disposed onboard a vehicle. The method determines a stopping distance of the vehicle based at least in part on the image data. The method determines a speed limit of the vehicle based on the stopping distance that is determined from the image data. The method determines a moving speed of the vehicle. The method controls movement of the vehicle based on a difference between the moving speed of the vehicle and the speed limit of the vehicle.

In accordance with one or more embodiments described herein, a system is provided. The system includes one or more vision sensors disposed onboard a vehicle and an onboard controller of the vehicle configured to obtain image data from the one or more vision sensors, determine a stopping distance of the vehicle based at least in part on the image data, determine a moving speed of the vehicle and a speed limit of the vehicle, the speed limit determined based on the stopping distance that is determined from the image data, and control movement of the vehicle based on a difference between the moving speed of the vehicle and the speed limit of the vehicle.

In accordance with one or more embodiments described herein, a method is provided that includes obtaining image data from one or more vision sensors disposed onboard a vehicle. The one or more vision sensors include one or more forward-facing vision sensors. The method determines a range of vision from the vehicle based at least in part on the image data. The method determines a stopping distance of the vehicle based at least in part on the image data and the range of vision. The method determines a moving speed of the vehicle and a speed limit of the vehicle. The speed limit is determined based on the stopping distance and the range of vision that are determined from the image data. The method controls movement of the vehicle based on a difference between the moving speed of the vehicle and the speed limit of the vehicle.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide for systems and methods that are configured to generate signals to control movement of a vehicle based on differences between the moving speeds and speed limits of the vehicle. The systems and methods control movement of the vehicle based at least in part on a detected and/or estimated range of vision of a vehicle operator. The systems and methods can obtain image data from one or more vision sensors disposed onboard the vehicle. The image data can be analyzed, alone or with other data, to determine a stopping distance of the vehicle. The stopping distance can be utilized to determine one or more of a moving speed of the vehicle and/or a speed limit of the vehicle. The speed limit can be determined based on the stopping distance that is determined from the image data. The systems and methods generate signals to control movement of the vehicle based on differences between the moving speed of the vehicle and the speed limit of the vehicle. The systems and methods improve speed management in vehicle networks by managing the speed of individual vehicles in a manner that accounts for the range of vision of the vehicle operator to reduce the occurrence of collisions and/or enhance the safety of vehicles in the vehicle network.

One or more embodiments of the inventive subject matter described herein allow for implementation of dynamic speed control and/or management based at least in part on the range of vision of the vehicle operator and, optionally, factors such as one or more of geography, weather conditions, or vehicle state information (e.g., length, mass, height, consist, etc.). Implementation of dynamic speed control and/or management can enhance the safety of vehicles and vehicle systems by limiting vehicle speed that will allow the vehicle to stop in time to avoid a collision with another vehicle or object or fouled or damaged pathways. In one example, implementation of dynamic speed control as part of a restricted speed policy on a vehicle network may reduce the number of accidents of vehicles on a vehicle network and/or increase the safety of vehicles on a vehicle network.

Figure 1:
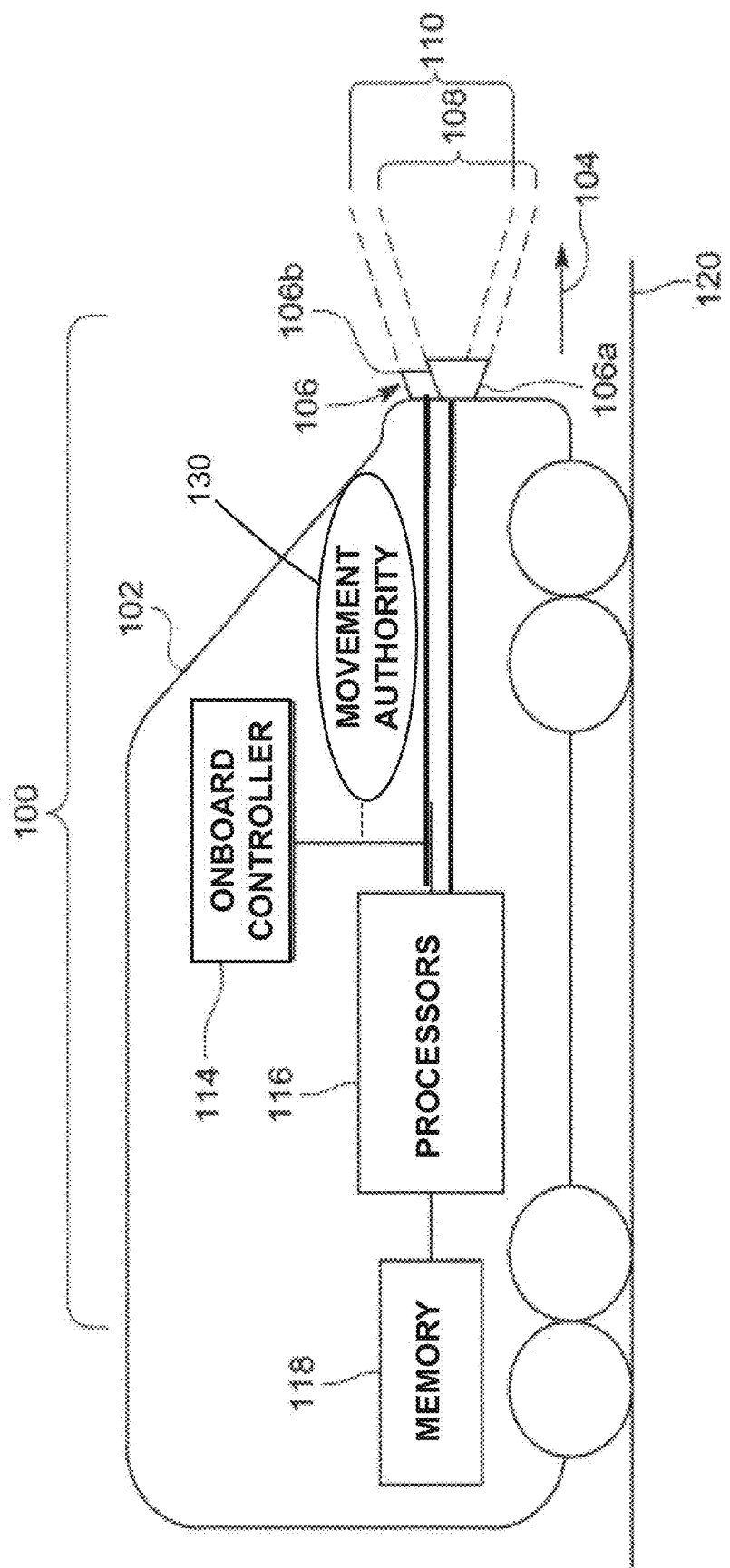
FIG. 1 illustrates an example of a system for managing a speed of a vehicle in accordance with one or more embodiments described herein.

FIG. 1 illustrates an example of a control system for managing a speed of a vehicle in accordance with one or more embodiments described herein. The control system 100 can be disposed onboard a vehicle 102. The term "vehicle" shall refer to any system for transporting or carrying one or more passengers and/or cargo. Types of vehicles 102 include automobiles, trucks, buses, rail vehicles (e.g., one or more locomotives and/or one or more rail cars), agricultural vehicles, mining vehicles, aircraft, industrial vehicles, marine vessels, automated and semi-automated vehicles, autonomous and semi-autonomous vehicles, and the like. The vehicle 102 can be connected with one or more other vehicles logically and/or mechanically, such as one or more locomotives connected with one or more rail cars, to form at least part of a consist. The term "consist," or "vehicle consist," refers to two or more vehicles or items of mobile equipment that are mechanically or logically coupled to each other. By logically coupled, the plural items of mobile equipment vehicles that communicate with each other to coordinate their movements to that the vehicles move together as a vehicle system (e.g., a convoy). In an example of a mechanically coupled consist, the vehicle 102 can be capable of propulsion to pull and/or push additional vehicles or other mobile equipment, either capable or incapable of propulsion, carrying passengers and/or cargo (e.g., a train or other system of vehicles).

In accordance with one or more embodiments described herein, an on-board controller 114 can implement a control system (e.g., a positive control system, negative control system, or other system). The onboard processors 116 includes and/or represents one or more hardware circuits or circuitry that includes and/or is coupled with one or more computer processors (e.g., microprocessors) or other electronic logic-based devices. The control system implemented by the onboard controller 114 can be positioned in a cabin of a vehicle (e.g., in an automobile, in a lead vehicle of a consist) and can monitor the location and movement of the vehicle 102 within a vehicle network. The terms "vehicle network" and "vehicle control network" shall refer to a control network implemented among one or more vehicles and/or one or more wayside communications modules in a vehicle network. Vehicle networks are capable of communicating and/or implementing one or more of positive controls, negative controls, open loop controls, closed loop controls, or the like. Vehicle networks may be used to manage one or more of vehicles, types of vehicles, modes of transport, traffic on ways, and the like associated with the vehicle network. Vehicle networks may manage pathways designed for one or more types of vehicles. Additionally or alternatively, vehicle networks may manage pathways designed for different types of vehicles. A vehicle network may exist in a static or dynamic geographic domain or among a select vehicle population. A vehicle network may also be formed on an ad-hoc basis between a plurality of vehicles. Non-limiting examples of vehicle control include vehicular ad hoc networks, positive train control networks, industrial autonomous vehicle networks, and the like.

In accordance with one or more embodiments herein, the control system can be a positive control system, a negative control system, or any other type of control system. In some examples, the control system can enforce travel restrictions including movement authorities 130 that prevent unwarranted movement of the vehicle 102 into certain route segments. Additionally or alternatively, the control system can allow the vehicle to enter certain route segments unless or until a signal from an off-board controller tells the vehicle 102 to not enter into the segment. Based on travel information generated by the vehicle network and/or received through a communications module (not shown), the control system can determine the location of the vehicle 102, how fast the vehicle can travel based on any travel restrictions, and, based on movement enforcement being performed, adjust the speed of the vehicle 102. The travel information can include travel restriction information, such as movement authorities and speed limits, which can be dependent on a vehicle network zone and/or a pathway. As an example, the control system may provide commands to the propulsion system of the vehicle 102 and, optionally, to propulsion systems of one or more additional trailing vehicles, to slow or stop the vehicle 102 (or consist) in order to comply with a dynamic speed restriction or a movement authority. It will be appreciated that the onboard controller 114 may also implement, in addition to or in lieu of positive controls, one or more of negative controls, open loop controls, closed loop controls, or the like without departing from the scope of the inventive subject matter discussed herein.

The system 100 includes one or more vision sensors 106 (e.g., vision sensors 106a, 106b) mounted or otherwise operably coupled with the vehicle 102 so that the vision sensors 106 move with the vehicle 102 along the pathway 120. The term "pathway" shall mean any road or other way on land, air, or water, including all public and private roads, tracks, and routes, regardless of any entity responsible for maintenance of the way (e.g., a private entity, a state entity, a provincial entity, a county entity, an international entity, or the like). The vision sensors may be visual (e.g., conventional cameras) and/or non-visual sensors (e.g., infrared sensors, Light Detection and Ranging (LIDAR) sensors, sonar sensors, radar systems, and the like). The vision sensors 106 may be forward facing vision sensors 106 in that the vision sensors 106 are oriented toward a direction of travel or movement 104 of the vehicle 102. For example, fields of view 108, 110 of the vision sensors 106 represent the space that is captured in image data obtained by the vision sensors 106. In the illustrated example, the vision sensors 106 are forward facing in that the fields of view 108, 110 capture image data of the space in front of the vehicle 102. The vision sensors 106 can obtain static (e.g., still) image data and/or moving image data (e.g., video). Optionally, one or more of the vision sensors 106 may be disposed inside the vehicle 102. For example, the vehicle 102 may include a cab vision sensor 106 disposed inside an operator cab of the vehicle 102. A vision sensor 106 disposed inside the vehicle 102 can obtain image data through a window or other aperture of the vehicle 102.

The vision sensors 106 can be capable of obtaining image data of the pathway 120 while the vehicle 102 is moving up to and at relatively fast speeds. For example, the image data may be obtained while the vehicle 102 is moving at or near an upper speed limit of the pathway 120, such as the speed limit of the pathway 120 when maintenance is not being performed on the pathway 120 or when the upper speed limit of the pathway 120 has not been reduced.

The vision sensors 106 operate based on signals received from the onboard processors 116. The onboard processors 116 activate the vision sensors 106 to cause the vision sensors 106 to obtain image data, optionally including a time stamp associated with the image data. This image data represents image data of the fields of view 108, 110 of the vision sensors 106, such as image data of one or more portions or segments of the pathway 120 disposed ahead of the vehicle 102. The onboard processors 116 can change the frame rate of the vision sensors 106 (e.g., the speed or frequency at which the vision sensors 106 obtain image data).

One or more processors 116 of the system 100 examine the image data obtained by one or more of the vision sensors 106. For example, the onboard controller 114 can include hardware and/or circuitry that includes and/or is coupled with one or more processors 116 (e.g., computer processors, digital signal processors, microcontrollers, systems on a chip, etc.). In one aspect, the processors 116 examine the image data by identifying which portions of the image data represent the pathway 120 and comparing these portions to benchmark image data. The benchmark image data can include one or more fiducial markers 350 that can be used as a point of reference or a measure in analysis of the image data. Fiducial markers may be either something present and/or placed in the field of view of the vision sensors 106 at a known distance from the vision sensors 106 and/or one or more marks in the reticles of one or more of the vision sensors 106. Additionally or alternatively, a fiducial marker can be a feature present on or otherwise associated with the pathway 120 in a field of view of the vision sensors 106 having known distances and dimensions. For example, the processors 116 can perform a calibration based on detecting a feature of interest in the pathway 120 (e.g., railway track tie separation, dimensions associated with traffic control features, etc.) The processors 116 can calibrate a process for determining the range of vision based on one or more of a fiducial marker and/or a human visual parameter (e.g., what a human with 20/20 vision would see based on the image data, etc.). For example, the processors 116 can perform a calibration for the vehicle 102 to account for differences in views based on locations of the vision sensors 106 on the vehicle 102. For example, the processors 116 can perform the calibration prior to a trip of the vehicle 102 or periodically during operation of the vehicle 102 on the vehicle network.

Image data representing one or more fiducial markers can be contained in benchmark visual profiles from among several such profiles stored in a computer readable memory, such as an image data memory 118. The memory 118 includes and/or represents one or more memory devices, such as a computer hard drive, a CD-ROM, DVD ROM, a removable flash memory card, a magnetic tape, or the like. The memory 118 can store image data obtained by the vision sensors 106 and the benchmark visual profiles associated with the vehicle 102 and/or trips of the vehicle 102.

Based on similarities or differences between one or more vision sensor-obtained image data and the benchmark image data, the processors 116 can determine the stopping distance of the vehicle on the segment of the pathway 120 captured by the vision sensors 106. Alternatively, the processors 116 can convert the image data to or generate the image data as wireframe model data. The wireframe model data can be used to identify the location, shape, or the like, of the pathway 120 to determine the stopping distance of the vehicle 102 on the segment of the pathway 120. The processors 116 can determine a range of vision from the vehicle 102 based on the image data and determine the stopping distance and/or the speed limit based on the range of vision. Based on the stopping distance, the processors 116 can determine a moving speed of the vehicle 102 and a speed limit of the vehicle 102. Additionally or alternatively, the moving speed of the vehicle 102 can be measured by separate sensors (e.g., accelerometers and the like). The speed limit can also be determined based on one or more of a distance to one or more objects present in the pathway (e.g., stationary or moving objects), one or more other vehicles, a state of a traffic signaling device 340, vehicle consist data associated with the vehicle, a sensed condition of the vehicle, a sensed condition of a pathway, or pathway data associated with a vehicle control network communicated by one or more wayside controllers. The processors 116 can generate a signal to control movement of the vehicle 102 based on a difference between the moving speed and a speed limit of the vehicle 102. The signal generated by the processors 116 can be used to restrict the moving speed of the vehicle 102 to an upper speed limit associated with a pathway 120 responsive to the speed limit determined from the image data exceeding the upper speed limit.

Figure 2:
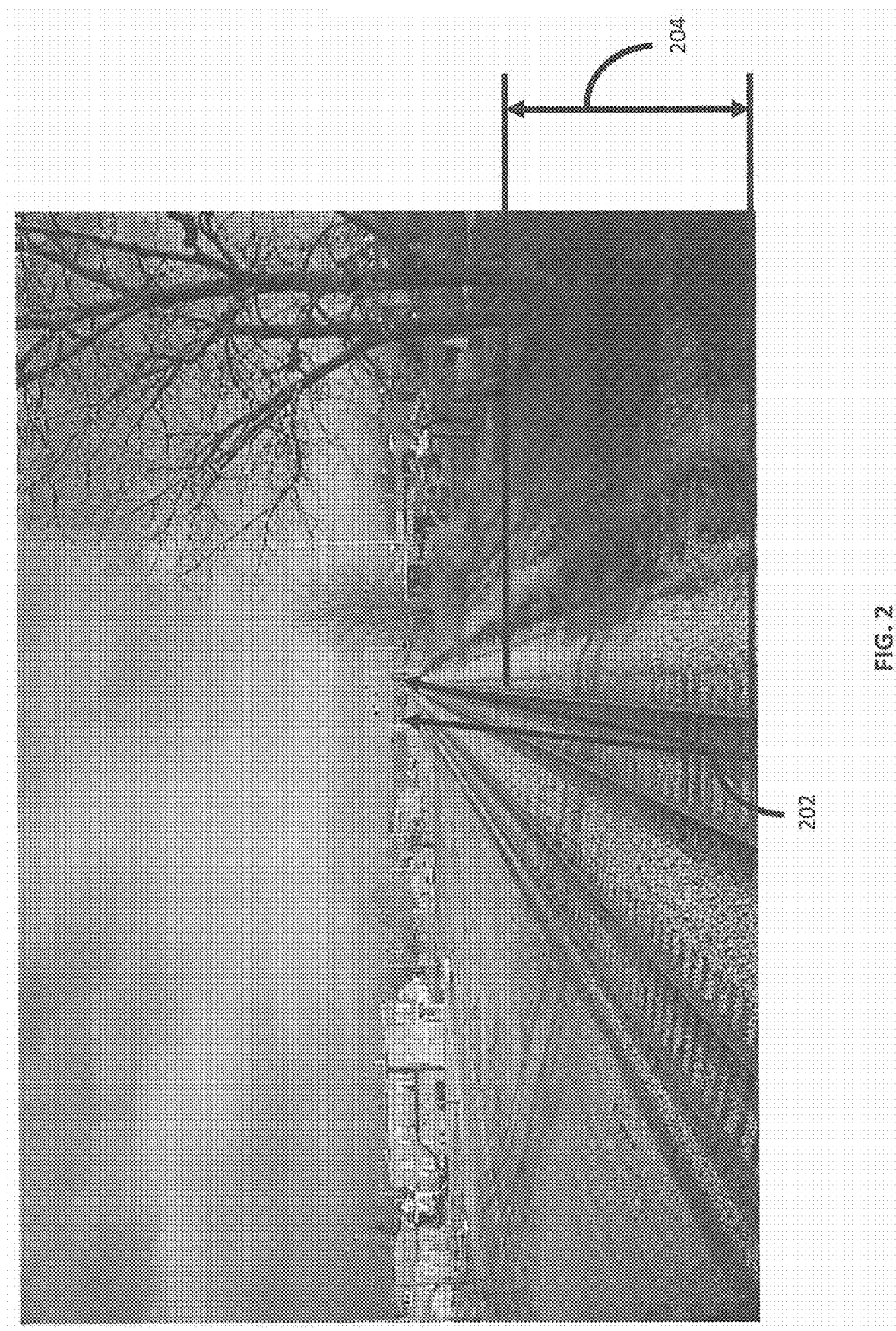
FIG. 2 illustrates one example of image data of the pathway obtained by one or more vision sensors of the vehicle of FIG. 1.
Figure 3:
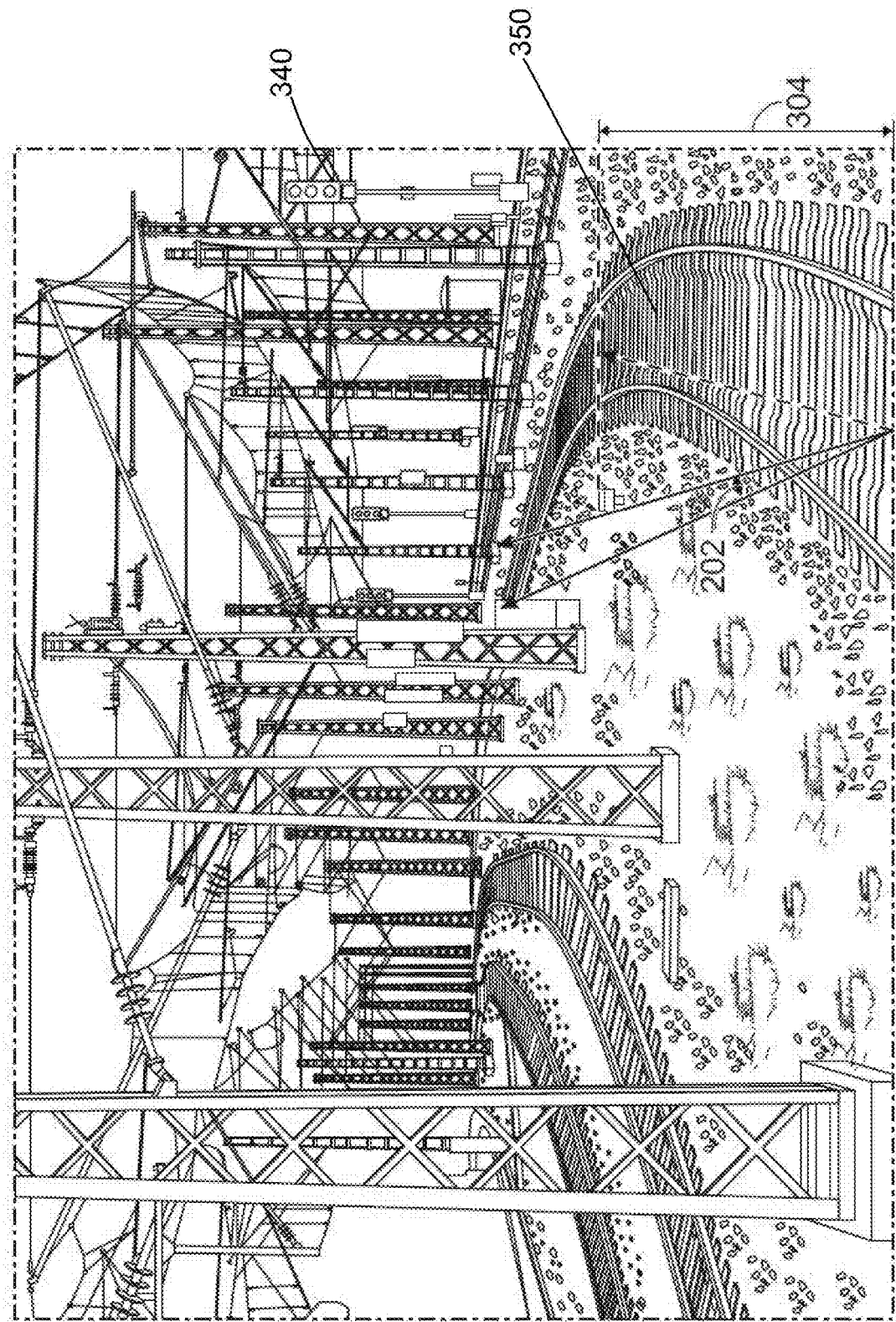
FIG. 3 illustrates another example of image data of the pathway obtained by one or more vision sensors of the vehicle of FIG. 1.

FIGS. 2 and 3 illustrate examples of image data of the pathway obtained by one or more vision sensors of the vehicle of FIG. 1. FIG. 2 illustrates a straight pathway having a range of vision indicated by the arrows 202. FIG. 3 represents a curved pathway having a range of vision indicated by the arrows 302 The vision sensors 106 obtain image data of the pathway. Based on receiving the image data, the processors 116 examine the image data and to determine the distance to the vanishing point of the pathway 120. The vanishing point of the pathway can be determined using known techniques (e.g., triangulation, etc.) and dimensions based on previous and/or concurrent calibration with a fiducial marker. The processors 116 can calculate the stopping distance 204, 304 as a fraction of the distance to the vanishing point of the pathway. The processors can also determine a speed limit of the vehicle 102 based on the required and/or desired stopping distance. The speed limit can also be determined based on one or more of a distance to one or more other objects present on the pathway (e.g., stationary or moving objects), vehicles present on the pathway, a state of a traffic signaling device, vehicle consist data associated with the vehicle, a sensed condition of the vehicle, a sensed condition of the pathway, or pathway data associated with a vehicle control network communicated by one or more wayside controllers. The processors 116 can generate a signal to control movement of the vehicle 102 based on a difference between the moving speed and a speed limit of the vehicle 102. The signal generated by the processors 116 can be used to restrict the moving speed of the vehicle 102 to an upper speed limit associated with a pathway 120 and/or the vehicle 102 responsive to the speed limit determined from the image data exceeding the upper speed limit. For example, the onboard controller 114 can implement a speed limit to stop the vehicle within a preselected stopping distance may be implemented. In an additional or alternative example, based on the speed limit of the vehicle exceeding a maximum speed limit associated with one or more segments of the pathway of a vehicle network, the onboard controller 114 can implement the upper speed limit associated with the pathway (or segments thereof). In an additional or alternative example, the onboard controller 114 can implement a speed limit based on stopping distance for a vehicle to safely stop. The stopping distance may be set by an authority, set by a user of the vehicle, or the like. Additionally or alternatively, the stopping distance may be a distance required to safely stop relative to one or more objects and/or one or more vehicles on the pathway. For example, the stopping distance and corresponding speed limits will have higher values for straight pathways having relatively far range of view, but lower values based on pathways having curves, hills, or the like having relatively shorter ranges of view. Other environmental factors that can reduce a range of view and, accordingly, the speed limit of the vehicle can include limited light conditions (e.g., dusk, night, overcast weather conditions, etc.), smoke, fog, and the like. In one example (e.g., FIG. 2), the range of vision may be calculated to be 500 feet for a straight pathway. Based on a stopping distance of ½ of the range of vision, the stopping distance may be 250 feet. Based on a stopping distance of 50 feet, the speed limit can be calculated to be 12 miles per hour. In another example (e.g., FIG. 3), the range of vision may be calculated to be 100 feet for a straight pathway. Based on a stopping distance of ½ of the range of vision, the stopping distance may be 50 feet. Based on a stopping distance of 50 feet, the speed limit can be calculated to be 5 miles per hour. Accordingly, the methods and systems herein enable implementation of dynamic speed control and/or management of vehicles 102 based at least in part on the range of vision of vehicle operator and, optionally, factors such as one or more of geography, weather conditions, or vehicle state information (e.g., length, mass, height, consist, etc.).

Figure 4:
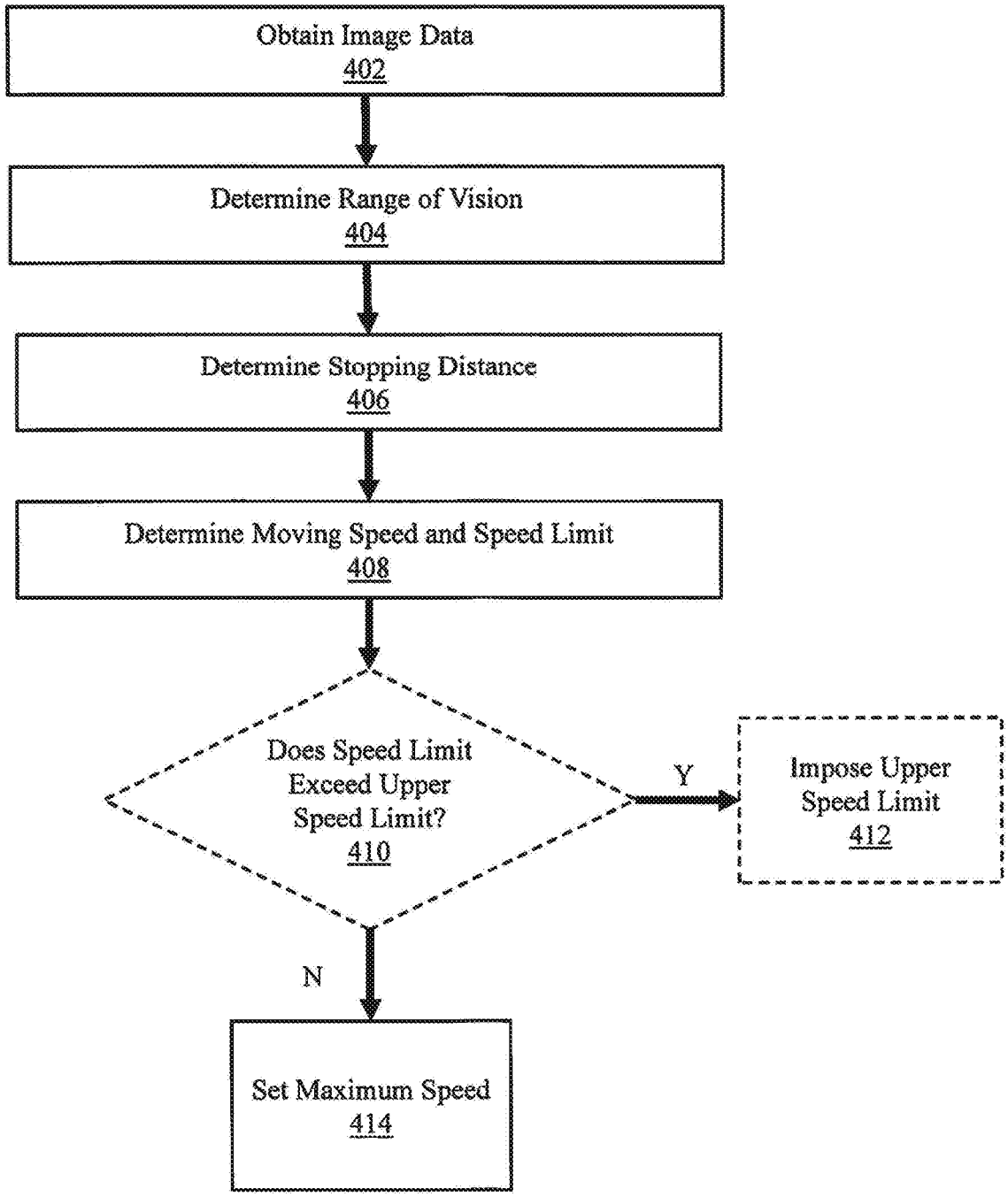
FIG. 4 illustrates an example method for managing a speed in accordance with one or more embodiments described herein.

FIG. 4 illustrates an example method for managing a speed in accordance with one or more embodiments described herein. The operations of FIG. 4 can be performed by one or more processors 116 in response to execution of program instructions, such as in applications stored in a storage medium implemented the onboard controller 114 and/or other on-board computing devices. Optionally, all or a portion of the operations of FIG. 4 may be carried out without program instructions, such as in an image signal processor associated with the vision sensors 106 that has the corresponding operations implemented in silicon gates and other hardware. It should be recognized that while the operations of method 400 are described in a somewhat serial manner, one or more of the operations of method 400 may be continuous and/or performed in parallel with one another and/or other operations of the onboard controller 114.

At 402, image data is obtained from one or more vision sensors 106 disposed onboard the vehicle 102. The image data can be obtained by one or more forward-facing vision sensors. For example, fields of view 108, 110 of the vision sensors 106 represent the space that is captured in image data obtained by the vision sensors 106. The vision sensors capture image data of the space in front of the vehicle 102, including the pathway 120. The vision sensors 106 can obtain static (e.g., still) image data and/or moving image data (e.g., video). In one aspect, the processors 116 examine the image data by identifying which portions of the image data represent the pathway 120. The image data can be compared to benchmark image data (e.g. representing one or more fiducial markers) in order to determine the distance between two or more objects of interest in the image data. Optionally, prior to and/or during operation of the vehicle, the method 400 can include calibrating a process for determining the range of vision based on one or more of a fiducial marker and/or a human visual parameter.

Optionally, at 404, the one or more processors 116 determine a range of vision from the vehicle 102 based at least in part on the image data. The range of vision can be determined based at least in part on determining a distance to a vanishing point of the pathway within the field of view of the one or more forward-facing vision sensors. For example, the distance to the vanishing point of the pathway 120 from the vehicle 102 may be determined by analyzing the image data to determine the vanishing point of one or more features of interest (e.g., the rails of the railway, traffic control markers on a pathway, etc.) and mathematical techniques (e.g., triangulation, quadrature, etc.) used to calculate the distance to the vanishing point. Additionally or alternatively, the range of vision may be based on one or more of a fiducial marker and/or a human visual parameter (e.g., 20/20 vision, etc.). The range of vision may be determined continuously and/or periodically. One or more values for range of vision may be combined (e.g., using an average, a mean, a median, a moving average, a moving mean, a moving median, etc.) or an estimated based on performing hysteresis over multiple range of vision values. Additionally or alternatively, a confidence level for the range of vision (or estimated range of vision) can be determined. Additionally or alternatively, the one or more processors 116 can limit the magnitude of changes in the speed limit over time so that the variation in speed limit is held within a selected threshold. The range of vision of the vision sensors 106 can be utilized to estimate the range of vision of a vehicle operator.

At 406, the one or more processors determine a stopping distance of the vehicle 102 based at least in part on the image data and the range of vision. The stopping distance can be determined based on the range of vision from the vehicle 102. The stopping distance can be a fraction of the range of vision of the vision sensors 106 and/or estimated range of vision of the vehicle operator. For example, the stopping distance can be 50% of the range of vision of the vision sensors 106 and/or estimated range of vision of the vehicle operator. Additionally or alternatively, the stopping distance can be determined based on two or more values of the range of vision.

At 408, the one or more processors 116 determine a moving speed of the vehicle 102 and a speed limit of the vehicle 102. The speed limit can be determined based at least in part on one or more of the stopping distance and/or the range of vision that are determined from the image data. For example, the speed limit can be determined to be the speed required to stop the vehicle 102 within the stopping distance. Additionally, the speed limit may also account for one or more of the geography, the weather conditions, and the vehicle state information (e.g., length, mass, consist, etc.). Additionally or alternatively, the speed limit can be determined also based on one or more of a distance to one or more obstructions (which may be stationary or moving), a distance to one or more other vehicles, a state of a traffic signaling device, vehicle consist data associated with the vehicle 102, a sensed condition of the vehicle 102, a sensed condition of a pathway 120, or pathway data associated with a vehicle control network communicated by one or more wayside controllers. Optionally, the moving speed of the vehicle 102 can be confirmed by referencing one or more additional speed sensors onboard the vehicle and/or operably coupled to the onboard controller 114. Additionally or alternatively, the moving speed can be obtained from speed sensors associated with the onboard controller 114. Optionally, at 410, based on the speed limit exceeding the upper speed limit, flow moves to 412. Optionally, at 410, based on the speed limit not exceeding the upper speed limit, flow moves to 414.

At 412 and 414, the one or more processors 116 control movement of the vehicle 102 based on a difference between the moving speed of the vehicle and the speed limit of the vehicle 102. At 412, controlling the movement of the vehicle can include restricting the moving speed of the vehicle to an upper speed limit associated with a pathway responsive to the speed limit exceeding the upper speed limit. Additionally or alternatively, restricting the moving speed of the vehicle can include stopping the vehicle based on exceeding the speed limit and/or upper speed limit. Controlling movement of the vehicle can include comparing the range of vision to two or more historical values of range of vision and updating the speed limit based on the comparison.

Figure 5:
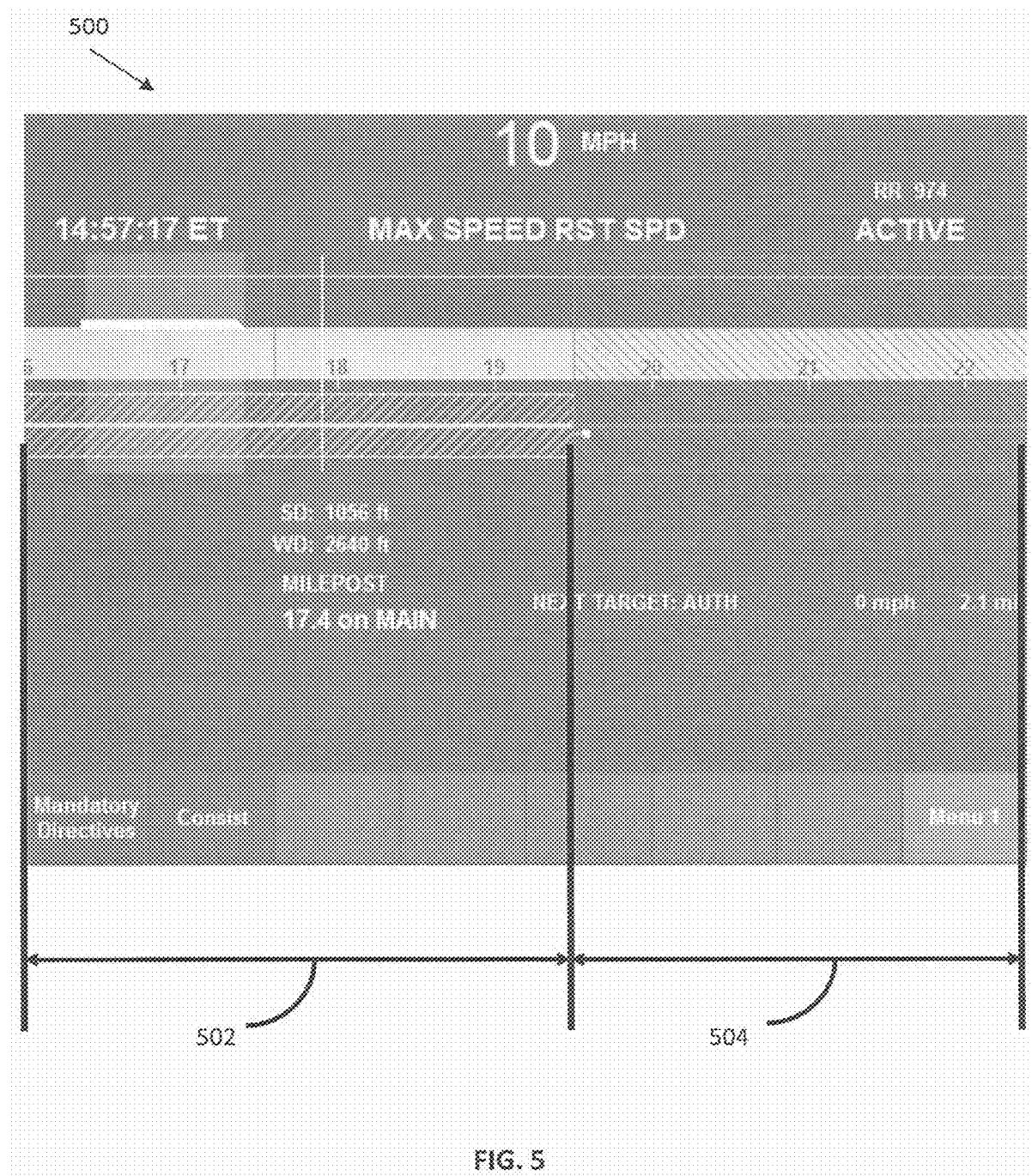
FIG. 5 illustrates an example of presentation of information on a graphical user interface in accordance with managing a speed in accordance with one or more embodiments herein.

FIG. 5 illustrates an example of presentation of information on a graphical user interface 500 in accordance with managing a speed in accordance with one or more embodiments herein. The vehicle 102 associated with the graphical user interface can be operating under a maximum speed limit associated with one or more pathway segments on a vehicle network. The pathway is represented by pathway segments 502 and 504. The speed limit of the first segment 502 of the pathway could change as the train moves within the range of pathway segment 502 based on the range of vision (or estimated range of vision) of the crew. In some examples, the onboard controller 114 may continuously and/or periodically determine the range of vision and update the range of vision based on changes in the range of vision that are above a threshold change and/or occur for a threshold time period. The displayed speed limit can be indicated to be a restricted speed value. For example, the graphical user interface may display the restricted speed value and indicate that the vehicle network is implementing a maximum restricted speed on one or more segments of the pathway on which the vehicle is traveling. The speed limit can be dynamic and based on the specific vehicle 102. Additionally or alternatively, the vehicle network may implement a stop target on the second segment 504 for the vehicle 102. The onboard controller 114 can implement stopping the vehicle 102 upon encountering the second segment 504.

Optionally, in accordance with one or more embodiments herein, controlling the movement of the vehicle can include restricting the moving speed of the vehicle to an upper speed limit associated with a pathway responsive to the speed limit determined from the image data exceeding the upper speed limit.

Optionally, in accordance with one or more embodiments herein, the methods and systems can determine a range of vision from the vehicle based on the image data, wherein the speed limit is determined also based on the range of vision.

Optionally, in accordance with one or more embodiments herein, the methods and systems can determine two or more values of the range of vision based on the image data, and determine the stopping distance based on the two or more values of the range of vision.

Optionally, in accordance with one or more embodiments herein, the methods and systems can determine the speed limit also based on one or more of a distance to one or more obstructions, a distance to one or more other vehicles, a state of a traffic signaling device, vehicle consist data associated with the vehicle, a sensed condition of the vehicle, a sensed condition of a pathway, or pathway data associated with a vehicle control network communicated by one or more wayside controllers.

Optionally, in accordance with one or more embodiments herein, the methods and systems can determine a range of vision from the vehicle based on the image data, wherein the stopping distance is determined based on the range of vision from the vehicle.

Optionally, in accordance with one or more embodiments herein, the methods and systems can include calibrating a process for determining the range of vision based on one or more of a fiducial marker or a human visual parameter.

Optionally, in accordance with one or more embodiments herein, the methods and systems can confirm the moving speed of the vehicle by referencing one or more additional speed sensors onboard the vehicle.

Optionally, in accordance with one or more embodiments herein, controlling movement of the vehicle can include comparing the range of vision to two or more historical values of range of vision and updating the speed limit based on the comparison.

Optionally, in accordance with one or more embodiments herein, the methods and systems can include obtaining image data from one or more forward-facing vision sensors and determining the range of vision by determining a distance to a vanishing point of the pathway within a field of view of the one or more forward-facing vision sensors.

Optionally, in accordance with one or more embodiments herein, the one or more vision sensors include one or more forward-facing vision sensors and the onboard controller is configured to determine the range of vision by determining a distance to a vanishing point of the pathway within a field of view of the one or more forward-facing vision sensors.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
    obtaining image data from one or more vision sensors disposed onboard a vehicle;
    determining a stopping distance of the vehicle based at least in part on the image data from the vehicle;
    determining a moving speed of the vehicle and a speed limit of the vehicle, the speed limit determined based on the stopping distance that is determined from the image data from the vehicle; and
    controlling movement of the vehicle by enforcing one or more movement authorities preventing unwarranted movement of the vehicle into one or more pathways based on a difference between the moving speed of the vehicle and the speed limit of the vehicle.

2. The method of claim 1, wherein controlling the movement of the vehicle further comprises restricting the moving speed of the vehicle to an upper speed limit associated with the one or more pathways responsive to the speed limit determined from the image data exceeding the upper speed limit.

3. The method of claim 1, further comprising determining a range of vision from the vehicle based on the image data, wherein the speed limit is determined also based on the range of vision.

4. The method of claim 1, wherein the speed limit is determined also based on one or more of a distance to one or more obstructions, a distance to one or more other vehicles, a state of a traffic signaling device, vehicle consist data associated with the vehicle, a sensed condition of the vehicle, a length of the vehicle, a height of the vehicle, a mass of the vehicle, a sensed condition of a pathway, or pathway data associated with a vehicle control network communicated by one or more wayside controllers.

5. The method of claim 1, further comprising determining a range of vision from the vehicle based on the image data, wherein the stopping distance is determined based on the range of vision from the vehicle.

6. The method of claim 5, wherein two or more values of the range of vision are determined based on the image data, wherein the stopping distance is determined based on the two or more values of the range of vision.

7. The method of claim 5, further comprising calibrating a process for determining the range of vision based on a fiducial marker.

8. The method of claim 5, wherein controlling movement of the vehicle further comprises comparing the range of vision to two or more historical values of range of vision and updating the speed limit based on a comparison of the range of vision to the two or more historical values of range of vision.

9. The method of claim 5, further comprising obtaining image data from one or more forward-facing vision sensors and determining the range of vision by determining a distance to a vanishing point of the one or more pathways within a field of view of the one or more forward-facing vision sensors.

10. The method of claim 1, wherein the moving speed of the vehicle is confirmed by referencing one or more additional speed sensors onboard the vehicle.

11. A system, comprising:
    one or more vision sensors disposed onboard a vehicle;
    an onboard controller of the vehicle configured to obtain image data from the one or more vision sensors, determine a stopping distance of the vehicle based at least in part on the image data from the vehicle, determine a moving speed of the vehicle and a speed limit of the vehicle, the speed limit determined based on the stopping distance that is determined from the image data from the vehicle, and control movement of the vehicle by enforcing one or more movement authorities preventing unwarranted movement of the vehicle into one or more pathways based on a difference between the moving speed of the vehicle and the speed limit of the vehicle.

12. The system of claim 11, wherein controlling the movement of the vehicle further comprises restricting the moving speed of the vehicle to an upper speed limit associated with the one or more pathways responsive to the speed limit determined from the image data exceeding the upper speed limit.

13. The system of claim 11, wherein the onboard controller is further configured to determine a range of vision from the vehicle based on the image data, wherein the speed limit is determined also based on the range of vision.

14. The system of claim 11, wherein the speed limit is also determined based on one or more of a distance to one or more other vehicles, a state of a traffic signaling device, vehicle consist data associated with the vehicle, a sensed condition of the vehicle, a length of the vehicle, a height of the vehicle, a mass of the vehicle, a sensed condition of a pathway, or pathway data associated with a vehicle control network communicated by one or more wayside controllers.

15. The system of claim 11, wherein the onboard controller is further configured to determine a range of vision from the vehicle based on the image data, wherein the stopping distance is determined based on the range of vision from the vehicle.

16. The system of claim 15, wherein the onboard controller is further configured to determine two or more values of the range of vision based on the image data, wherein the stopping distance is determined based on the two or more values of the range of vision.

17. The system of claim 15, wherein the onboard controller is further configured to calibrate a process for determining the range of vision based on a fiducial marker.

18. The system of claim 17, wherein the one or more vision sensors include one or more forward-facing vision sensors and the onboard controller is configured to determine the range of vision by determining a distance to a vanishing point of the one or more pathways within a field of view of the one or more forward-facing vision sensors.

19. A method, comprising:
    obtaining image data from one or more vision sensors disposed onboard a vehicle, wherein the one or more vision sensors include one or more forward-facing vision sensors;
    determining a range of vision from the vehicle based at least in part on the image data;
    determining a stopping distance of the vehicle based at least in part on the image data from the vehicle and the range of vision;
    determining a moving speed of the vehicle and a speed limit of the vehicle, the speed limit determined based on the stopping distance and the range of vision that are determined from the image data from the vehicle; and
    controlling movement of the vehicle by enforcing one or more movement authorities preventing unwarranted movement of the vehicle into one or more pathways based on a difference between the moving speed of the vehicle and the speed limit of the vehicle.

20. The method of claim 19, wherein controlling the movement of the vehicle further comprises restricting the moving speed of the vehicle to an upper speed limit associated with the one or more pathways responsive to the speed limit determined from the image data exceeding the upper speed limit.

* * * * *